US006904182B1

(12) United States Patent
Simard et al.

(10) Patent No.: US 6,904,182 B1
(45) Date of Patent: Jun. 7, 2005

(54) WHITEBOARD IMAGING SYSTEM

(75) Inventors: Patrice Y. Simard, Bellevue, WA (US); Michael J. Sinclair, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/552,370

(22) Filed: Apr. 19, 2000

(51) Int. Cl.[7] .......................... G06K 9/36; G06K 9/40; G06K 9/20
(52) U.S. Cl. ................... 382/284; 382/274; 382/312
(58) Field of Search .................... 382/274, 112, 382/113, 185, 186, 187, 189, 294, 284, 312; 358/412; 348/14.01, 14.04, 14.09

(56) References Cited

U.S. PATENT DOCUMENTS

| | | | | | |
|---|---|---|---|---|---|
| 3,818,445 | A | * | 6/1974 | Neville | 382/282 |
| 5,410,611 | A | * | 4/1995 | Huttenlocher et al. | 382/177 |
| 5,450,127 | A | * | 9/1995 | Shimizu et al. | 348/205 |
| 5,528,290 | A | * | 6/1996 | Saund | 348/218.1 |
| 5,581,637 | A | * | 12/1996 | Cass et al. | 382/284 |
| 5,689,300 | A | * | 11/1997 | Shibata et al. | 348/14.07 |
| 5,737,011 | A | * | 4/1998 | Lukacs | 348/14.09 |
| 5,764,799 | A | * | 6/1998 | Hong et al. | 382/225 |
| 5,978,028 | A | * | 11/1999 | Yamane | 348/373 |
| 5,999,214 | A | * | 12/1999 | Inagaki | 348/211.12 |
| 6,195,176 | B1 | * | 2/2001 | Tanno et al. | 358/400 |
| 6,300,975 | B1 | * | 10/2001 | Yamane | 348/63 |
| 6,330,082 | B1 | * | 12/2001 | Oliver | 358/473 |
| 6,400,848 | B1 | * | 6/2002 | Gallagher | 382/254 |
| 6,476,862 | B1 | * | 11/2002 | Tatsumi et al. | 348/14.08 |
| 6,512,539 | B1 | * | 1/2003 | Dance et al. | 348/203 |
| 6,522,787 | B1 | * | 2/2003 | Kumar et al. | 382/268 |
| 6,539,112 | B1 | * | 3/2003 | Smith | 382/181 |

FOREIGN PATENT DOCUMENTS

JP 62-160868 * 7/1987 ............ H04N/1/00

OTHER PUBLICATIONS

IBM Technical Disclosure Bulletin, NN7007351, Jul. 1970.*
Press Release, "Scitex announces new Leaf C–MOST technology—Over six mega pixel CMOS sensor", pp. 1–2, Jan. 10, 2000.
Press Release, "Panoscan—A Breakthrough in Panoramic Capture", Feb. Review in Panorama Magazine, pp. 1–3, Feb. 1999.
Stephen Manes, "Interacting Up", Forbes, pp. 248–250, Nov. 15, 1999.
Haffner et al., "Browsing Through High Quality Document Images with DjVu", pp. 309–318, IEEE 1998.
Bottou et al., "High Quality Document Image Compression with 'DjVu'", pp. 410–425, vol. 7(3), Journal of Electronic Imaging, Jul. 1998.
Press Release, "Panasonic Exhibits Full Lineup of Electronic Whiteboards", pp. 1–2, Nov. 16, 1998.
Website, "A Low–Cost Digital Panoramic Camera", Interactive Media Technology Center, Georgia Institute of Technology, SIGGraph 97, available at: http://www.oip.gatetech.edu/misc/PANCAM Slides.
Website, "Plus Electronic Copyboards", Kintronics, available at: http://www.Kintronics.com/plus, printed Dec. 10, 1999.
Website, "GWA Presents: PLUS Electronic Copyboard Information & Sale!", available at http://www.gwaco.com/copyboard, printed Dec. 10, 1999.
Website, MicroTouch, available at: http://www.microtouch.com/ibid/applicat, printed Dec. 10, 1999.
Website, panoptic Vision available at: http://www.panopticvision.com, printed Aug. 18, 2000.

* cited by examiner

Primary Examiner—Mehrdad Dastouri
(74) Attorney, Agent, or Firm—Westman, Champlin & Kelly

(57) ABSTRACT

An image capturing system is installable in a room opposite a writing surface. The image capturing system is adapted to take visual images of the writing surface and identify information written thereon.

22 Claims, 9 Drawing Sheets

WHITEBOARD IMAGING SYSTEM

BACKGROUND OF THE INVENTION

The present invention relates to devices for obtaining information from a whiteboard or other writing surface. More particularly, the present invention relates to a system for obtaining visual images of the writing surface.

Whiteboards are used commonly in schools, businesses or other gathering locations. Typically, the whiteboard includes a smooth planar surface that is mountable, for example, to a wall or other structure. Pens, typically of different colors, allow one or more individuals to draw on the whiteboard to explain ideas, concepts and the like.

Various systems have been advanced in order to capture and record information written on a whiteboard. For instance, a whiteboard has been designed to include a pressure-sensitive array that senses contact and movement of the pen on the surface. In another embodiment, an ultrasonic sensor is mounted to the whiteboard. The sensor receives ultrasonic signals from transmitters provided on pens or erasers. The sensor triangulates a position of the pen or eraser on the board as the user writes or erases information.

Although the prior art systems have enjoyed some success, widespread adoption of any one technology has not yet been achieved. Significant impediments include the current use of inexpensive whiteboards already installed in many locations. To use some of the systems advanced, these inexpensive whiteboards would have to be discarded and more expensive systems would have to be bought and installed. Although some technologies use current whiteboards, such as the ultrasonic system described above, users must now use special pens, erasers and techniques in order to capture the information.

There thus is a continuing need for a system to capture information on a whiteboard. Such a system would preferably use existing whiteboards, but would not require special pens, erasers, or other techniques that the operator must use or adapt to in order to capture information on the whiteboard.

SUMMARY OF THE INVENTION

An image capturing system is installable in a room opposite a writing surface. The image capturing system is adapted to take visual images of the writing surface and identify information written thereon.

A second broad aspect includes an image capturing system having a visual sensor providing image data corresponding to sensed images. The visual sensor is selectively directed toward a first position to sense a first image and toward a second position to sense a second image. An image processor is coupled to the visual sensor to receive the image data from the visual sensor. The image processor is capable of processing the image data as a function of direction of the visual sensor toward the first position or the second position.

A third broad aspect includes an image capturing system having a visual sensor providing image data corresponding to sensed visual images. The visual sensor includes a set of adjacent sensing elements being exposed collectively to successive portions of the image. In other words, the same sensing elements will be used more than once, to sense different portions, during capture of a single image. A storage device stores sensing element control values. A controller is coupled to the storage device and the visual sensor. The controller controls a time duration of exposure of the sensing elements to the portion of image as a function of exposure to successive portions.

A fourth aspect includes a method of obtaining information provided on a writing surface in a room. The method includes locating an image capturing system at a second location in the room remote from the writing surface; sensing a visual image of the writing surface with the image capturing system; and identifying information provided on the writing surface with the image capturing system.

DETAILED DESCRIPTION OF THE ILLUSTRATIVE EMBODIMENTS

Figure 1:
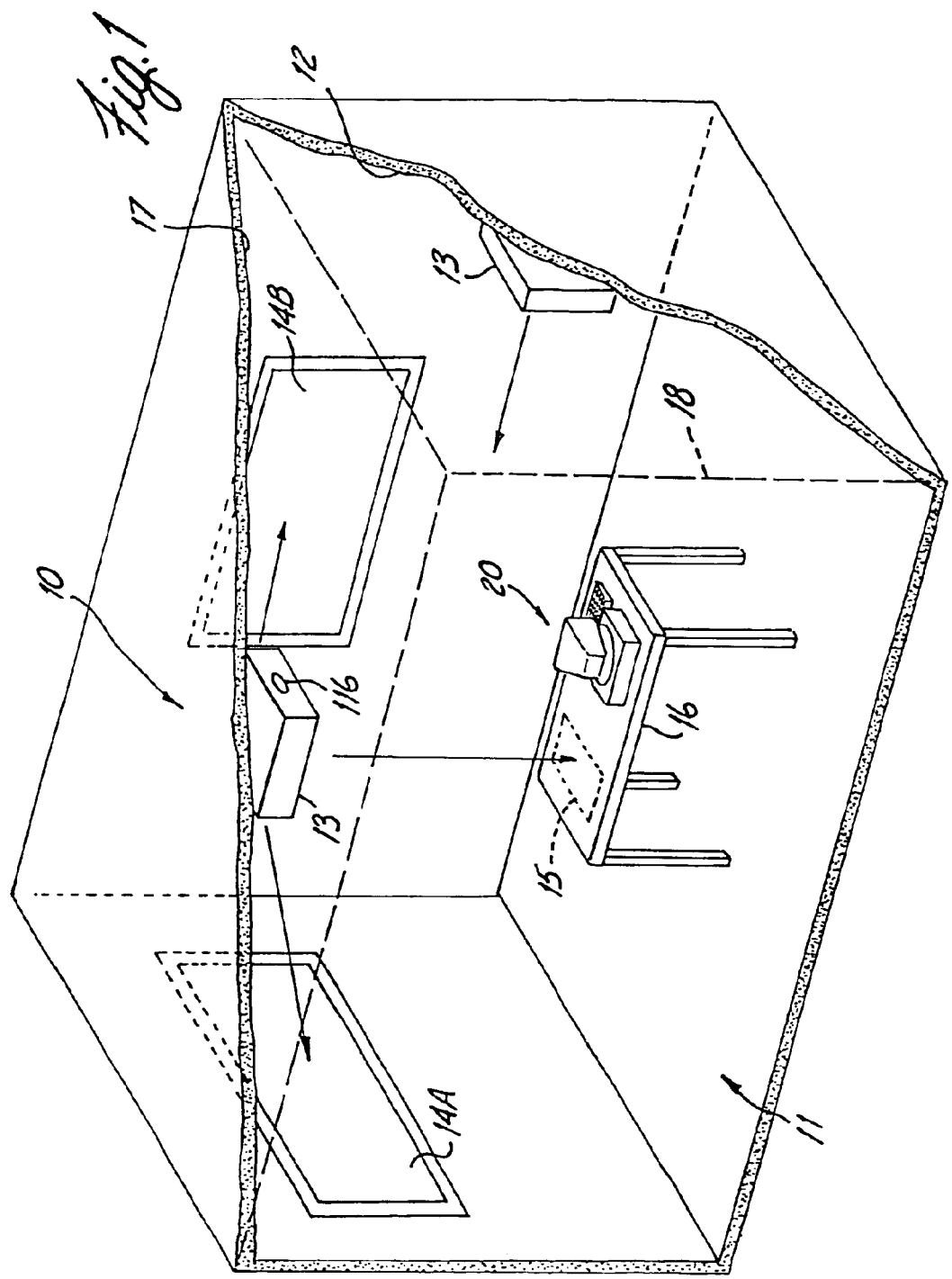
FIG. 1 is a perspective view of a room with portions removed illustrating exemplary locations for a visual sensor.

Referring to FIG. 1, a first broad aspect of the present invention includes an image capturing system 10 disposed in a room 11 having a defined writing surface 14A, such as a whiteboard. In the embodiment illustrated, the image capturing system 10 includes a visual sensor 13 that visually senses images provided on the writing surface 14A. An image processor 20, such as a desktop computer, receives image data from the visual sensor 13 and is adapted to identify information provided on the writing surface 14A.

Generally, the visual sensor 13 is disposed in a fixed location in the room 11 so as to obtain substantially identical, successive images of the writing surface 14A. In FIG. 1, two exemplary positions are illustrated. In a first position, visual sensor 13 is mounted to a wall 12, or some other like fixed structure, that is generally opposite the writing surface 14A so as to face the writing surface 14A. In a second position, visual sensor 13 is disposed on a ceiling 17, or other suspended structure, in order to view the writing surface 14A from above. The second position is also convenient for obtaining visual images of other writing surfaces, such as writing surface 14B. In yet a further embodiment, the visual sensor 13 can be directed to also obtain visual images of other areas in the room 11, for example, a predefined surface area 15 of a table or desk 16 located below the visual sensor 13. It should be noted that the ceiling location of visual sensor 13 is not the only location in the room 11 in order to view multiple writing surfaces or predefined areas. For instance, depending upon the location of the writing surfaces 14A and 14B in the room 11, visual sensor 13 could be located in a corner or other fixed position in order to selectively view the writing surfaces 14A and 14B.

Figure 2:
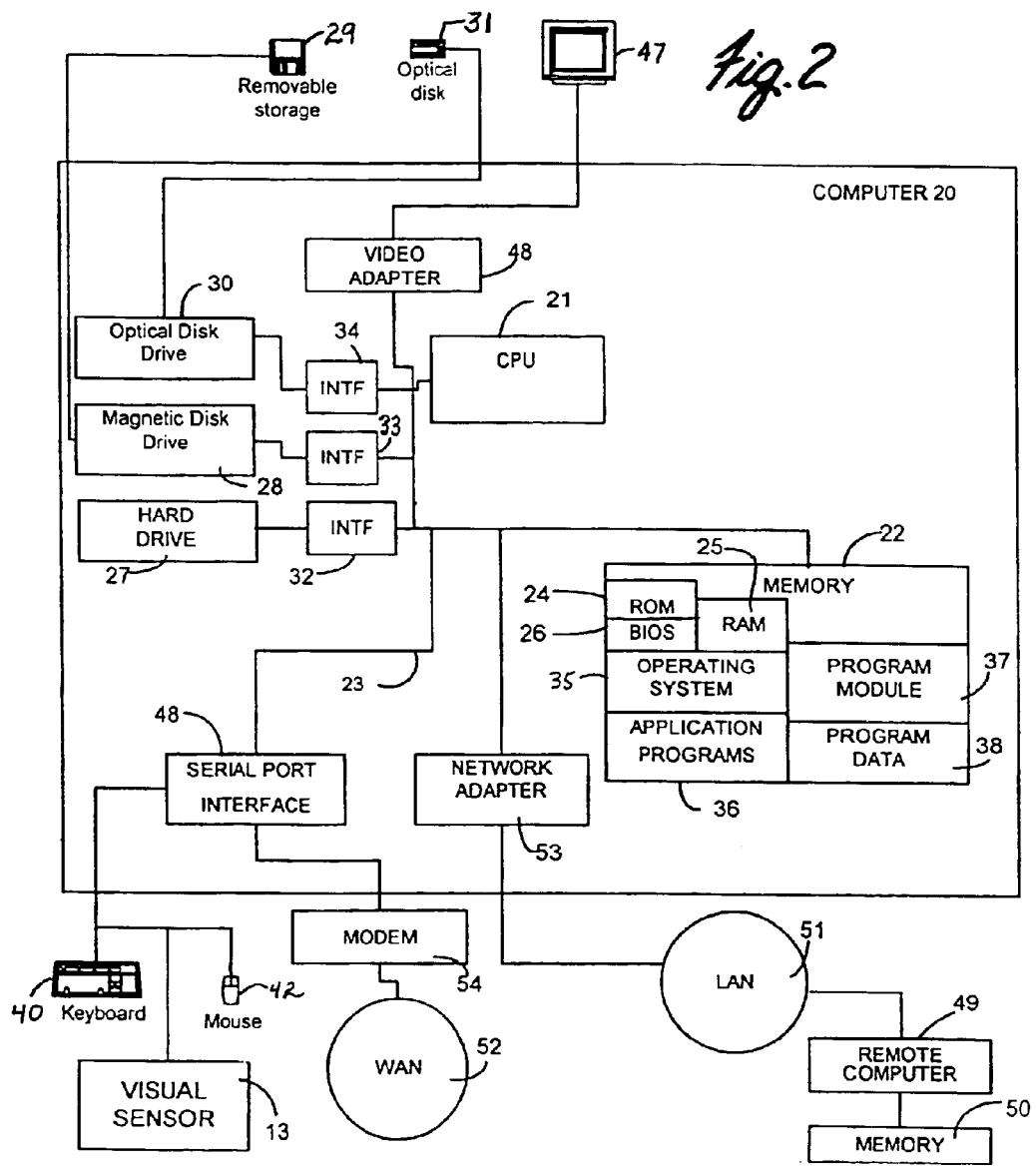
FIG. 2 is a schematic block diagram of an image capturing system.

FIG. 2 and the related discussion are intended to provide a brief, general description of a suitable computing environment in which the image processing system 10 may be implemented. Although not required, the image processing system 10 will be described, at least in part, in the general context of computer-executable instructions, such as program modules being executed by a controller, a personal computer or other computing device. Generally, program modules include routine programs, objects, components, data structures, etc., that perform particular tasks or implement particular abstract data types. Those skilled in the art can implement the description, block diagrams and flow charts to computer-executable instructions. In addition, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 2, an exemplary environment for the image processor includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31, such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device (mouse) 42. Other input devices (not shown) may include a microphone, joystick, game pad, satellite dish, scanner, or the like. These and other input devices, including the visual sensor 13, are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 2. The logic connections depicted in FIG. 2 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53.

When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Although described above wherein a desktop computer 20 will process image data from the visual sensor 13, it should be noted that the visual sensor 13 could also include some of the components used for processing and storage. For instance, the visual sensor 13 could include a processor for processing the image data for storage on a mass storage device such as a hard disk or floppy disk. If stored on a floppy disk, the image data can then be removed and transferred to another computer. Likewise, a wired or wireless communications interface can be included to transfer data from the visual sensor 13 to other computing devices.

Figure 3:
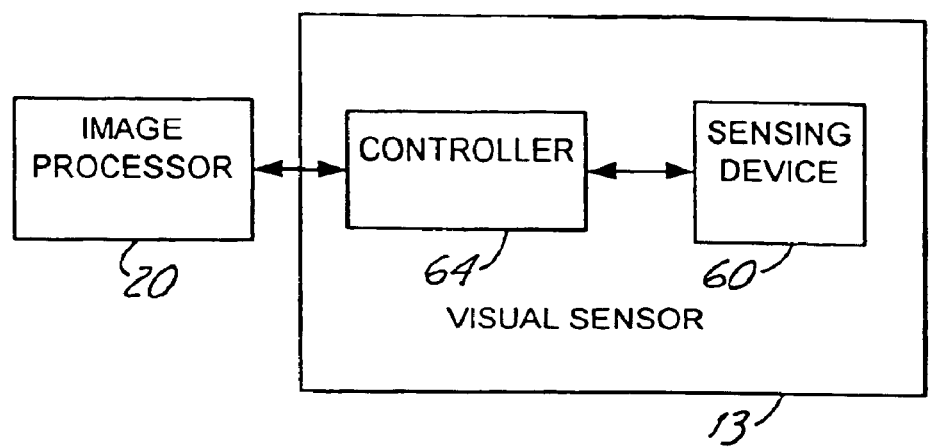
FIG. 3 is a schematic block diagram of the visual sensor.

FIG. 3 is a block diagram of an exemplary form of the visual sensor 13. Generally, the visual sensor 13 includes a visual sensing device 60 operably coupled to a controller 64. As appreciated by those skilled in the art, the visual sensing device 60 can take many forms, for instance, sensing devices commonly used in digital cameras, video cameras, scanners, fax machines, or digital copiers can be used. Referring to the embodiment illustrated in FIG. 4, the visual sensing device 60 comprises a linear array of sensing elements (e.g. charge coupled devices "CCD") such as commonly found in scanners. In order to obtain a complete visual image of the writing surface 14A, the linear array 60 scans the writing surface 14A and receives successive portions of the writing surface 14A. As is well known, an output signal from the linear array 60 is related to each successive portion of the writing surface 14A. The output signals are provided to controller 64. Controller 64 operates the linear array 60. As used herein, the controller 64 can include components such as a processor, memory and software for operation and an interface for communication with the computer 20. If desired, the controller 64 can process or operate upon the data received from the linear array 60 in order to provide compression or encoding, as is known in the art. Generally, the linear array 60 and the controller 64 can be of the type commonly found in scanners, fax machines, digital copiers and the like.

Figure 4:
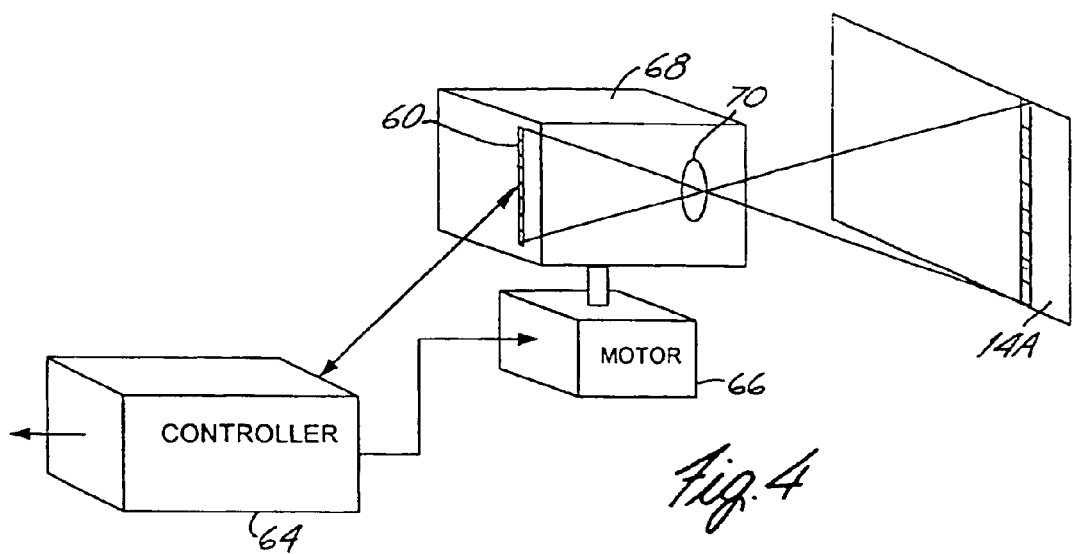
FIG. 4 is a functional block diagram of a first embodiment of the visual sensor.
Figure 5:
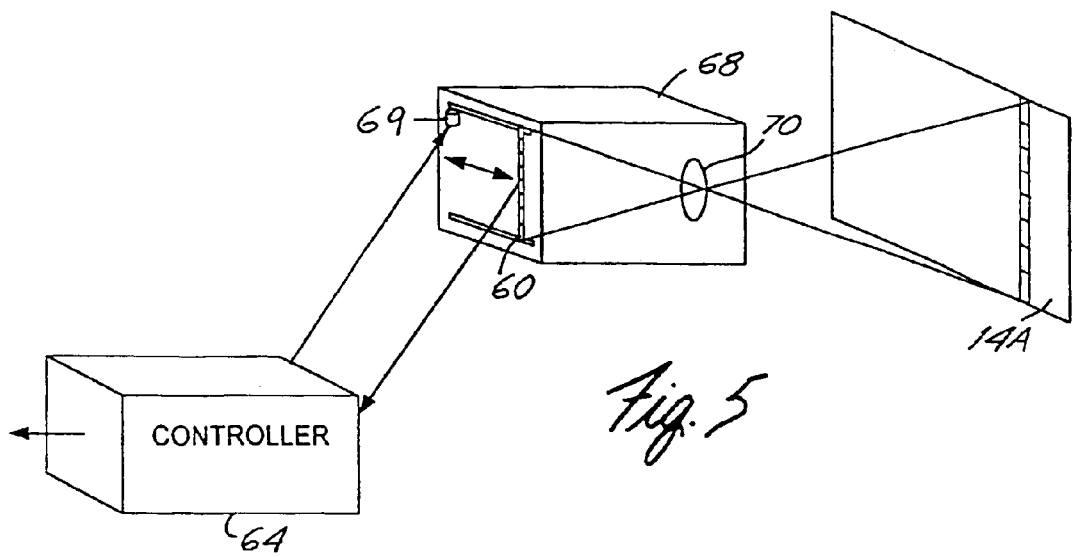
FIG. 5 is a functional block diagram of a second embodiment of the visual sensor.
Figure 6:
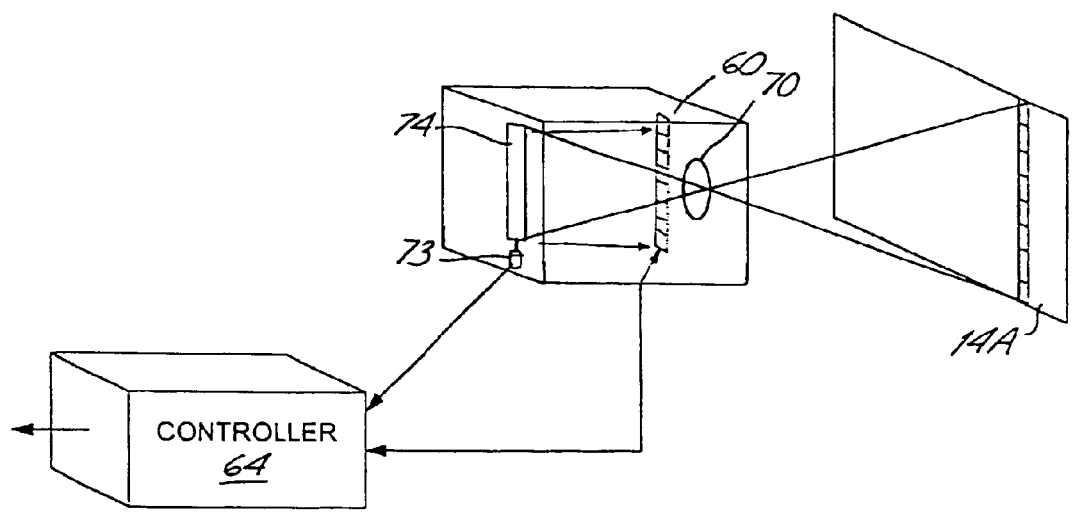
FIG. 6 is a functional block diagram of a third embodiment of the visual sensor.

Various means can be used to provide successive visual portions of the writing surface 14A to the linear array 60. As illustrated in FIG. 4, a panning motor 66 is coupled to a housing 68 or other structure used to support a lens 70 and the linear array 60. The panning motor 64 rotates the housing 68 in order to scan the writing surface 14A. For uniformity and simplicity, the angular velocity can be a constant. However, the velocity can also be varied. In another embodiment as illustrated in FIG. 5, the linear array 60 is displaced linearly within the housing 68 by a motor 69 similar to a scanner. In this embodiment, the housing 68 and the lens 70 remain substantially fixed. In yet another embodiment as illustrated in FIG. 6, a motor 73 rotates a mirror 74 to reflect successive portions of the writing surface 14A to the linear array 60. These techniques can be used by themselves or in combination to direct the visual sensor 13 to one or more writing surfaces 14A, 14B and surface 15.

The image data from the sensing device 60 can be temporarily stored by the controller 64 and then transferred to the image processor 20. Alternatively, the image data can be transferred immediately to the image processor 20, where it must be stored as it arrives.

Figure 7:
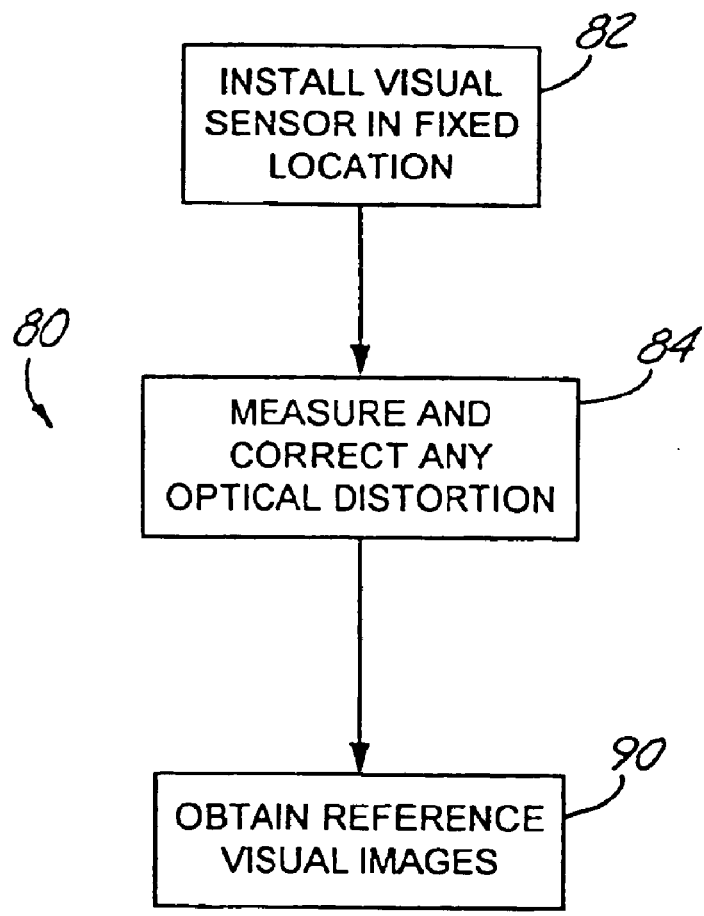
FIG. 7 is a flow chart illustrating setup of the image capturing system.

FIG. 7 illustrates a method 80 of installation of the image capturing system 10. Step 82 includes installing the visual sensor 13 at a fixed location to obtain visual images of the desired writing surface 14A. Typically, optical distortion may exist in the visual image sensed by the visual sensor 13, depending upon the relative location of the visual sensor 13 with respect to the writing surface 14A. One common form of optical distortion includes "keystoning" where a rectangular writing surface 14A may result in a trapezoidal or other non-rectangular visual image. Other forms of optical distortion include lens distortions; distortions generated by the scanning setup in FIG. 4 where the distance to particular image portions, and hence their size on the image sensor, vary across the writing surface; ghost images (due to misalignment of R,G and B sensors: can be fixed by detection with convolution followed by subtraction of ghosts); blurring (due to lack of resolution of sensors-can be partially corrected by multiple scans, also called hyper-resolution); and sensor saturation (cannot be fixed, but can be avoided by calibration, or multiple scan at various sensitivity levels).

Figure 8:
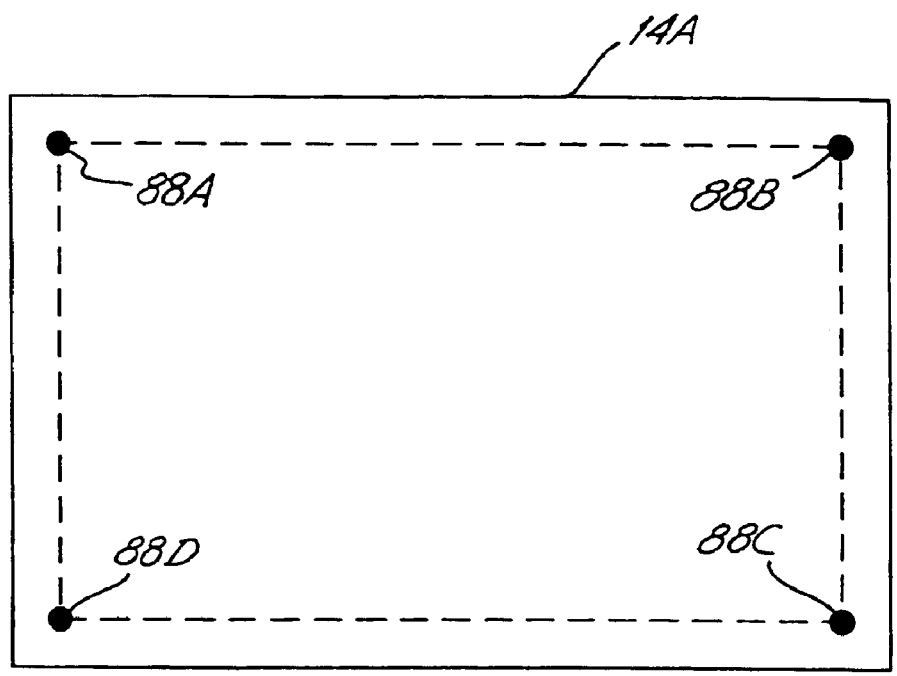
FIG. 8 is an elevation view of a writing surface.

Step 84 comprises measuring any optical distortion and providing processing values therefore for each writing surface 14A, 14B or predefined surface 15. The processing values can be stored either in the controller 64 in a storage device such as memory, or in the image processor 20 in any of the storage devices described above. Referring to FIG. 8, step 84 can include placing markers 88A, 88B, 88C and 88D or other identifiers on each writing surface 14A, 14B or predefined surface 15 in a pattern. For example, the markers 88A–88D can be used disposed at the corners of a rectangle. (Note, for distortions other than keystoning, like lens and scanning distortions, four or more markers, for example, nine equally spaced markers may be needed to obtain corrections.) The visual sensor 13 is then operated to obtain a visual image of the writing surface 14A or predefined surface 15 with the markers 88A–88D. In one embodiment, the visual image obtained for the visual sensor 13 can be displayed upon the monitor 47. The user can then identify each of the markers 88A–88D as input into a program or other routine to calculate the optical distortion and obtain a processing value-or values, which would correct the visual image to yield a true representation of the writing surface 14A or predefined surface 15. As used herein, a "processing value" includes any corrective technique, function or quantity, and therefore should not be construed narrowly. In yet another embodiment, the program or routine can automatically identify the markers 88A–88D and calculate the necessary correction value to perform the required optical corrections.

At this point, it should be noted that the lens 70 of the visual sensor 13 can include a zoom lens in order to magnify the visual image of the writing surface 14A or predefined surface 15 to efficiently use all available resolution provided by the sensing device 60, such as the linear array. If the visual sensor 13 is used to provide visual images of two or more different areas (e.g. writing surfaces 14A and 14B and/or predefined surface area 15), the zoom lens can be motor-actuated wherein a processing value is stored by the controller 64 indicative of the proper setting for each writing surface 14A, 14B or area 15 to be viewed. In another embodiment, a plurality of fixed focal length lenses can be selectively placed (manually or automatically) in the optical path of the visual sensor 13 in order to provide some optical magnification wherein software routines can be provided to perform additional magnification. Of course, software magnification can also be provided with the zoom lens.

Step 90 represents an optional step of obtaining reference visual images of the writing surface 14A under different lighting conditions. In particular, in view that the writing surface 14A, 14B or predefined surface area 15 may have different levels of an incident light from lights within the room or from outside conditions through windows, it may be helpful to obtain one or more reference visual images. For instance, one reference visual image can be obtained on a bright sunny day with the window shades open and with all the lights in the room on. Another reference visual image may be obtained for the same conditions except with the window shades closed. Likewise, reference visual images can be obtained on cloudy days, at night and at various levels of room lighting. Reference visual images can also be obtained at different times during the day if incident light upon the writing surface or other surface to be scanned changes throughout the day.

The reference visual image or images obtained at step 90 can be used in order to extract information provided on the writing surface 14A. For instance, when a visual image is obtained of the writing surface 14A having information present thereon, one of the reference visual images can be compared with the current image in order to extract the information. In many cases, the writing surface 14A only contains a limited amount of text, numbers, shapes or other information whereas a majority of the writing surface 14A is not used and therefore remains its unchanged or background color. By comparing the current visual image with a reference visual image of the writing surface 14A where no information is present, the information (i.e. the foreground) of the current visual image can be easily obtained. In one exemplary embodiment for a whiteboard having a white surface, information written on the writing surface will correspond to less light intensity sensed by the sensing elements of the linear array 60 than that of the background. Corresponding values can be associated for different levels of light intensity. A comparison then can be performed by subtracting the value of a sampled portion of the current visual image (e.g. the value of one sensing element of linear array 60 for one linear portion of the visual image) from the corresponding value of the sampled portion of the reference visual image. If the resulting value exceeds a threshold, information can be considered present for the sampled portion of the current visual image. In this manner, the current visual image is compared to the reference visual image element by element to obtain the information on the writing surface 14A. Depending on the lighting conditions or the time of day, the closest reference visual image can be used in order to minimize effects of bright areas, glares, shadows, etc.

At this point it should be noted that compression can be provided for distribution of the images. As appreciated as those in the art, writing surfaces such as whiteboards are mostly white, and the information written thereon is mostly lines of uniform colors. A good compression algorithm for this type of image could be to separate the image into a foreground (the ink) and a background (the white) with a binary image, called a mask, which tells if a pixel belongs to the foreground (1) or the background (0). Algorithms for computing the mask can be as simple as a fixed threshold on the luminance (above the threshold is foreground and below is background) or more complex, such as the algorithms used in DjVu™, for example, as described in "High Quality Document Image Compression with DjVu", Journal of Electronic Imaging, 1998 and "Browsing Through High Quality Document Images with DjVu", In Proc. of Advances in Digital Libraries 98. IEEE, 1998, which are hereby incorporated by reference in their entirety. The binary image can be compressed using standard FAX compression. Because the mask is binary and is typically made out of smooth lines, the mask has an ideal distribution for an arithmetic encoder, such as used in FAX compression. The foreground and the background are smooth color images with don't care conditions on the masked part. The binary image can be compressed with "masked wavelets" (i.e. a wavelet representation which agrees with the image on the "do care" pixels, and have values on the "don't care" pixel in order to maximize compression). For instance, the background can be set to white on its "don't care" pixel, resulting in a mostly white image with smoothly varying shades depending on the lighting. Such an image compresses very well with wavelets. Similarly, the foreground has mostly "don't care" pixels, which can be set to the color of the pen in the region surrounding ink, leading to images which are mostly uniform in large regions.

The reference visual images can also be used to calibrate the sensing device 60 for various lighting conditions. In particular, processing values such as gain adjustments or sampling speeds (time duration of exposure of the sensing element) of the sensing device 60 can be calculated for each reference visual image and stored for later use with each visual image having information to obtain. The appropriate stored gain adjustments or sampling speeds can then be retrieved based on the surface 14A, 14B or 15 being imaged, the current lighting conditions, and/or the time of day, and applied to the current visual image to improve performance.

In the embodiment illustrated in FIGS. 4–6, the sensing device 60 comprises a linear array of sensing elements that is exposed to portions of the writing surface 14A, 14B and surface 15 successively. The gain adjustments or sampling speeds of the sensing elements can be stored as control values in a storage device accessible by the controller 64. The controller 64 can make gain adjustments and sampling speed adjustments to all the sensing elements as a group for each image portion of visual image. Alternatively, gain adjustments and sampling speed adjustments of the sensing elements can be made in smaller groups of the sensing elements in the array for each image portion, or even individually for each image portions.

In another mode of operation, the reference visual image is obtained before each visual image that is used to record information on the writing surfaces 14A, 14B or the predefined surface area 15. In this manner, the gain adjustments and/or sampling speeds can be calculated and adjusted based on the current lighting conditions. If desired, the reference visual image could be taken more quickly (i.e. lower resolution) than a normal visual image. Also, the reference visual image can be considered valid for a selected time period, wherein if a visual image is desired after the time period has elapsed, a new reference visual image can be obtained. As appreciated by those skilled in the art, the reference visual images discussed herein can include some written information on the writing surface and need not be completely devoid of any markings, etc. The gain adjustments and/or sampling speeds can be calculated as the mean or other statistical function of response of the sensing device 60 to provide the reference visual image.

Figure 9:
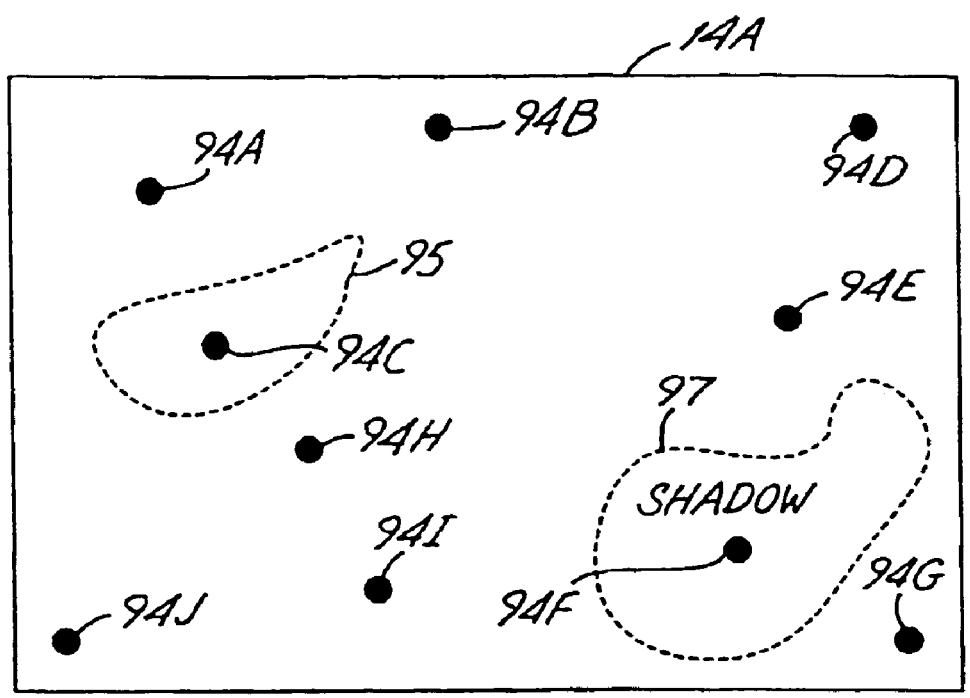
FIG. 9 is an elevation view of the writing surface.

The gain adjustments and/or sampling speeds can also be calculated based on samples taken from a plurality of locations 94A, 94B, 94C, 94D, 94E, 94F, 94G, 94H, 94I, and 94J (herein exemplified as ten locations) on the writing surface 14A, 14B or predefined surface 15 such as illustrated in FIG. 9. The gain adjustments and/or sampling speeds for other locations on the writing surface 14A, 14B and predefined surface area 15 can then be interpolated and/or extrapolated based on the plurality of locations 94A–94J. If any of the plurality of locations 94A–94J is suspected to include information (foreground material), the location can be omitted. Another possibility is to identify the foreground colors in a color histograms (the foreground colors will appear as sharp peaks). The pixels identified as foreground can then be replaced by the surrounding background color to yield a "cleaned" reference background image. In this manner, previous visual images could be used as a reference visual image for calculation of gain adjustments and/or sampling speeds for a later visual image.

It should also be noted that a visual image of the writing surface 14A, 14B or predefined surface area 15 need not be obtained from only one scan or image thereof. In other words, the visual image of the writing surface 14A, 14B or predefined surface area 15 can be formed from a composite of a plurality of separate scans or images. As illustrated in FIG. 9, the writing surfaces 14A, 14B or predefined surface area 15 may include areas of bright intensity 95, for example, from lights or windows, or areas having shadows 97. From the reference visual image or the current visual image, these areas can be identified from the response of the sensing device 60, for example, when light intensity exceeds or falls below selected thresholds. The gain adjustment and/or sampling speed can then be adjusted to compensate for one of the identified areas, and the writing surface 14A, 14B or predefined surface area 15, or portion thereof, can be rescanned or reimaged and stored. Additional visual images can be obtained with appropriate compensation provided for each identified area. Since each visual image is taken from the same fixed position, and since the writing surfaces 14A, 14B and predefined surface area 15 are also fixed, multiple visual images can be easily combined to form a composite with greater clarity than any one scan or image.

Figure 10:
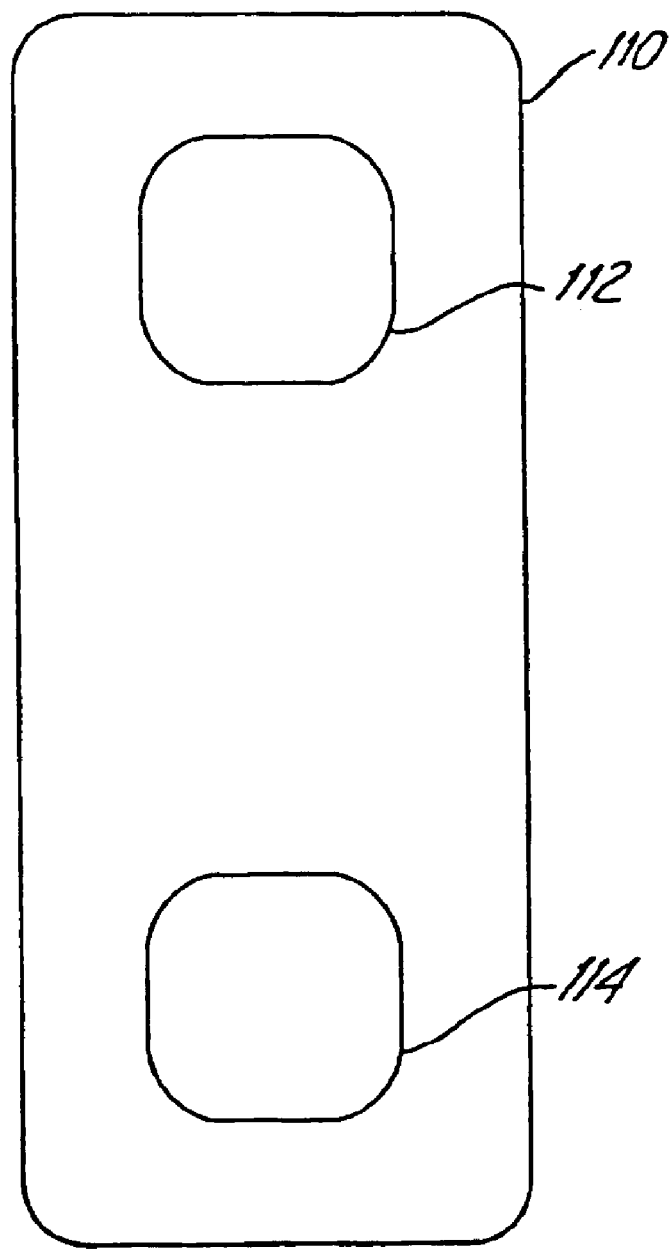
FIG. 10 is a top plan view of a user-operated switch.

The image capturing system 10 can be initiated manually, at the visual sensor 13, at the image processor 20, and/or with a remote, possibly, handheld switch. FIG. 10 is an exemplary top plan view of a remote handheld switch 110. A first button 112 can be used to indicate to the visual sensor 13 that a visual image of writing surface 14A should be obtained, while a second button 114 can be used to indicate that the visual sensor 13, or a portion thereof such as mirror, should be directed at the second writing surface 14B or predefined surface area 15 to obtain a corresponding visual image. Of course, additional buttons can be provided for other imaging areas.

If desired, the visual sensor 13 can be operated so as to obtain periodic visual images of the writing surface 14A. An indicator 116 (FIG. 1) such as a light or a speaker on the visual sensor 13, the image processor 20 or the switch 110 can be used to indicate to users in the room 11 that the visual sensor 13 is going to obtain a visual image shortly, or that the visual sensor 13 is obtaining a visual image. If periodic visual images are obtained, a software routine can be provided to compare the current visual image with one or more prior images and keep only those that have changed. For instance, the subtraction technique described above can be used wherein suitable thresholds are provided to detect new information including erasures.

In summary, the image capturing system 10 enables information to be easily obtained from a writing surface or predefined surface area. The information can be stored in any suitable format for transfer to other computers or applications. If desired, optical character recognition can be performed on the textual portions of the information. Likewise, other portions of the information having simple drawings can be converted into known drawing formats.

Although the present invention has been described with reference to preferred embodiments, workers skilled in the art will recognize that changes may be made in form and detail without departing from the spirit and scope of the invention.

What is claimed is:

1. An image capturing system comprising:
   a visual sensor adapted to provide image data corresponding to sensed visual images of a writing surface and a second area spaced apart from the writing surface, wherein the sensed visual images each comprise successive linear array portions;
   an image processor coupled to the visual sensor to receive the image data from the visual sensor, the image processor adapted to identify information provided on the writing surface apart from the writing surface and further adapted to identify information provided on the second area apart from the second area;
   a storage device for storing reference visual images, wherein the image processor is coupled to the storage device to access the reference visual images corresponding to each of the writing surface and the second area to identify information provided on the writing surface and the second area, wherein the image processor is adapted to identify an area requiring reimaging, and wherein the image processor controls the visual sensor to obtain at least one second visual image corresponding to the at least one portion of the writing surface or the second area, if reimaging is required, and wherein the processor is adapted to combine the first-mentioned visual images with the at least one second visual image.

2. The image capturing system of claim 1, wherein the storage device stores processing values comprising a first processing value and a second processing value, and wherein the image processor processes the image data of the first writing surface using the first processing value, and wherein the image processor processes the image data of the second area using the second processing value.

3. The image capturing system of claim 2 wherein the visual sensor includes a zoom lens, and wherein the first processing value relates to a first setting of the zoom lens and the second processing value relates to a second setting of the zoom lens.

4. The image capturing system of claim 1, wherein the visual sensor comprises a sensing device having a plurality of sensing elements.

5. The image capturing system of claim 4 wherein the sensing device comprises a linear array of sensing elements.

6. The image capturing system of claim 4 wherein a sensing element control value is provided for each sensing element for each successive linear array portion of the images.

7. The image capturing system of claim 1, wherein the visual sensor comprises a sensing device adapted to scan the writing surface and the second area.

8. The image capturing system of claim 1 and further comprising a storage device for storing processing values related to correction of the visual images from the writing surface and the second area for optical distortion, wherein the image processor is coupled to the storage device to access and use the processing values during image processing.

9. The image capturing system of claim 1, wherein the visual sensor is disposed above the writing surface.

10. The combination of claim 9 wherein the visual sensor is mounted to a ceiling of the room.

11. The image capturing system of claim 1 wherein the visual sensor is disposed within the room to sense images of the writing surface and the second area spaced apart from the writing surface.

12. The combination of claim 11 wherein the visual sensor is mounted to a wall of the room.

13. The combination of claim 12 wherein the visual sensor is disposed above the writing surface.

14. The combination of claim 13 wherein the visual sensor is mounted to a ceiling of the room.

15. A method of obtaining information provided on a writing surface and a second area spaced apart from the writing surface in a room, the method including:
   locating an image capturing system at a second location in the room remote from the writing surface and the second area;
   sensing visual images from each of the writing surface and the second area with the image capturing system, wherein sensing comprises sensing successive linear array portions of the visual images;
   identifying information provided on the writing surface and the second area with the image capturing system, wherein identifying information includes identifying information as a function of reference visual images of the writing surface and the second area;
   reimaging at least the at least one area of the writing surface and the second area to obtain at least one second visual image; and
   combining first-mentioned at lease one visual image with the second at least one visual image, wherein sensing includes sensing a plurality of visual images of each of the writing surface and the second area, wherein identifying includes identifying information as a function of the plurality of visual images from each of the writing surface and the second area, wherein identifying information includes detecting at lease one area of the writing surface and the second area requiring reimaging.

16. The method of claim 15, wherein sensing visual images includes compensating for distortion of the visual images.

17. The method of claim 15 wherein identifying includes comparing a first visual image to a second visual image.

18. The method of claim 15 wherein sensing visual images includes initiating sensing of a visual image with a switch movable relative to the second location.

19. The method of claim 15, wherein the image capturing system is selectively directable to obtain the visual images of each of the writing surface and the second area, the method further comprising directing the image capture system toward the writing surface and the second area.

20. The method of claim 19 wherein a switch is operated to direct the image capture system toward the writing surface and the second area.

21. The method of claim 19 wherein sensing comprises providing image data corresponding to the visual images of each of the writing surface and the second area, and wherein the method further comprises storing a first processing value and a second processing value, and processing the image data using the first processing value and the second processing value as a function of direction of the image capture system toward the writing surface and the second area, respectively.

22. The method of claim 15 wherein sensing comprises scanning each of the writing surface and the second area.

* * * * *